United States Patent [19]
McLaughlin et al.

[11] Patent Number: 5,564,521
[45] Date of Patent: Oct. 15, 1996

[54] TORQUE ROD ASSEMBLY

[75] Inventors: Ronald J. McLaughlin, Maumee; Darin J. Hull, Norwalk, both of Ohio

[73] Assignee: The Pullman Company, Lebanon, N.J.

[21] Appl. No.: 376,749

[22] Filed: Jan. 23, 1995

[51] Int. Cl.$^6$ .................................................. B60K 17/00
[52] U.S. Cl. ............................................................. 180/352
[58] Field of Search ............................................... 180/352

[56] References Cited

U.S. PATENT DOCUMENTS

| | | | |
|---|---|---|---|
| 2,319,430 | 5/1943 | Olley et al. | 180/352 |
| 2,323,007 | 6/1943 | Borgward | 180/352 |
| 3,231,040 | 1/1966 | Blanchette | 180/352 |
| 3,768,829 | 10/1973 | Colovas et al. | 180/352 |
| 4,804,205 | 2/1989 | Parsons | 180/352 |
| 5,037,125 | 8/1991 | Zamitter et al. | 180/352 |
| 5,366,035 | 11/1994 | Hayashida et al. | 180/352 |

*Primary Examiner*—Kenneth R. Rice
*Attorney, Agent, or Firm*—Fay, Sharpe, Beall, Fagan, Minnich & McKee

[57] ABSTRACT

A torque rod assembly includes two subassemblies. The subassemblies are configured in a V-shape and comprise forged eyelets joined by a solid bar extending through the eyelets at an apex end of the V. Within the eyelets there is an elastomer bushing. The elastomer bushings surround the metal bar joining the subassemblies. The assembly is suitably installed on a vehicle with the apex end connected to the axle assembly and the opposite end attached to the frame of the vehicle.

16 Claims, 3 Drawing Sheets

TORQUE ROD ASSEMBLY

BACKGROUND OF THE INVENTION

This invention relates to a torque rod assembly adaptable for use in truck and bus applications. More particularly, the invention is directed to an improved, generally V-shaped torque rod assembly that allows elastomers to be used at both the apex end and opposite ends thereof.

While the invention is particularly directed to the art of vehicle suspension systems, and will be thus described with specific reference thereto, it will be appreciated that the invention may have usefulness in other fields and applications.

A suspension system for a truck or bus typically utilizes one of two types of torque rod assemblies to isolate the axle from the frame, provide lateral stability and provide axle alignment. Both types of assemblies are attached to the axle at one end and the vehicle frame at the other.

However, in the first type, a lateral rod attachment, torque rods are positioned fore and aft on both sides of the axle as well as laterally across the vehicle for stability. In the second type, a "V" assembly having a rigid apex end and a machined ball contained within a rigid spherical bushing is used. The bushing is typically retained within a metal ring. Two metal tubes, or subassemblies, are attached to the ring in a "V" configuration. At the opposite ends of the tubes, metal rings contain elastomer bushings with metal inner components. The "V" shape provides lateral stability and fore and aft isolation.

The main difficulty with the lateral rod attachment method is the costs associated with using three torque rods per axle. Further, there are some disadvantages associated with tight turning radii that make such systems undesirable for service where tight turns are anticipated. The axle pivot point varies depending upon axle articulation, causing hops and jerks and reducing bushing life at nonpivot locations.

The V-shaped configuration using the rigid apex is likewise very expensive. The rigid apex joint allows no independent articulation of the legs of the "V". Further, the apex joint is susceptible to deterioration and must be regularly lubricated.

Elastomer apex joints for the V-shaped configuration heretofore contemplated only single joints. Accordingly, these single joints could not withstand the forces involved, since the single elastomer apex joint carried double the load of the elastomers provided to the opposite ends of the apex joint.

The present invention contemplates a new and improved V-shaped torque rod assembly which resolves the above-referenced difficulties and others by, among other things, reducing the cost of the "V" type assembly, providing superior shock and vibration isolation by doubling the amount of elastomers at the apex, providing independent articulation of the "V" legs to improve ride, and reducing maintenance and service requirements.

SUMMARY OF THE INVENTION

An improved V-shaped axle-frame isolation device, or torque rod assembly, is provided. Two subassemblies are joined at the apex end by a single bar, or component.

In another aspect of the invention, each of the apex ends of the two subassemblies includes a forged eyelet, or ring, having an elastomer bushing contained therein and disposed about the single bar.

In accordance with a more limited aspect of the invention, the single bar has a circumferential collar disposed therearound so that the collar is between the bar and the bushings.

In accordance with a still more limited aspect of the invention, the opposite ends of the subassemblies are likewise equipped with elastomer bushings contained within eyelets, or rings, attached thereto.

One advantage of the present V-shaped axle-frame isolation device is that it provides superior shock and vibration isolation.

Another advantage of the assembly is that it provides superior ride characteristics.

Another advantage of the assembly is that it is generally less expensive than other methods.

Another advantage of the assembly is that it allows independent articulation of the arms of the "V" assembly.

Another advantage of the assembly is that it requires no lubrication.

Another advantage of the assembly is that it has no seals to wear or leak.

Another advantage of the assembly is that it can be repaired by replacing only the elastomer bushings.

Another advantage of the assembly is that it can be easily modified to provide superior isolation or lower cost depending upon the application.

Another advantage of the assembly is that it reduces stress at the juncture of the apex and "V" arms, allowing the possibility of weight reduction.

Another advantage of the assembly is that it can be mounted on existing vehicles formerly using "V" configuration rods with rigid apex.

Another advantage of the assembly is that it adapts to variations in frame to axle distances with limited stress on elastomer bushings and metals.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention, will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
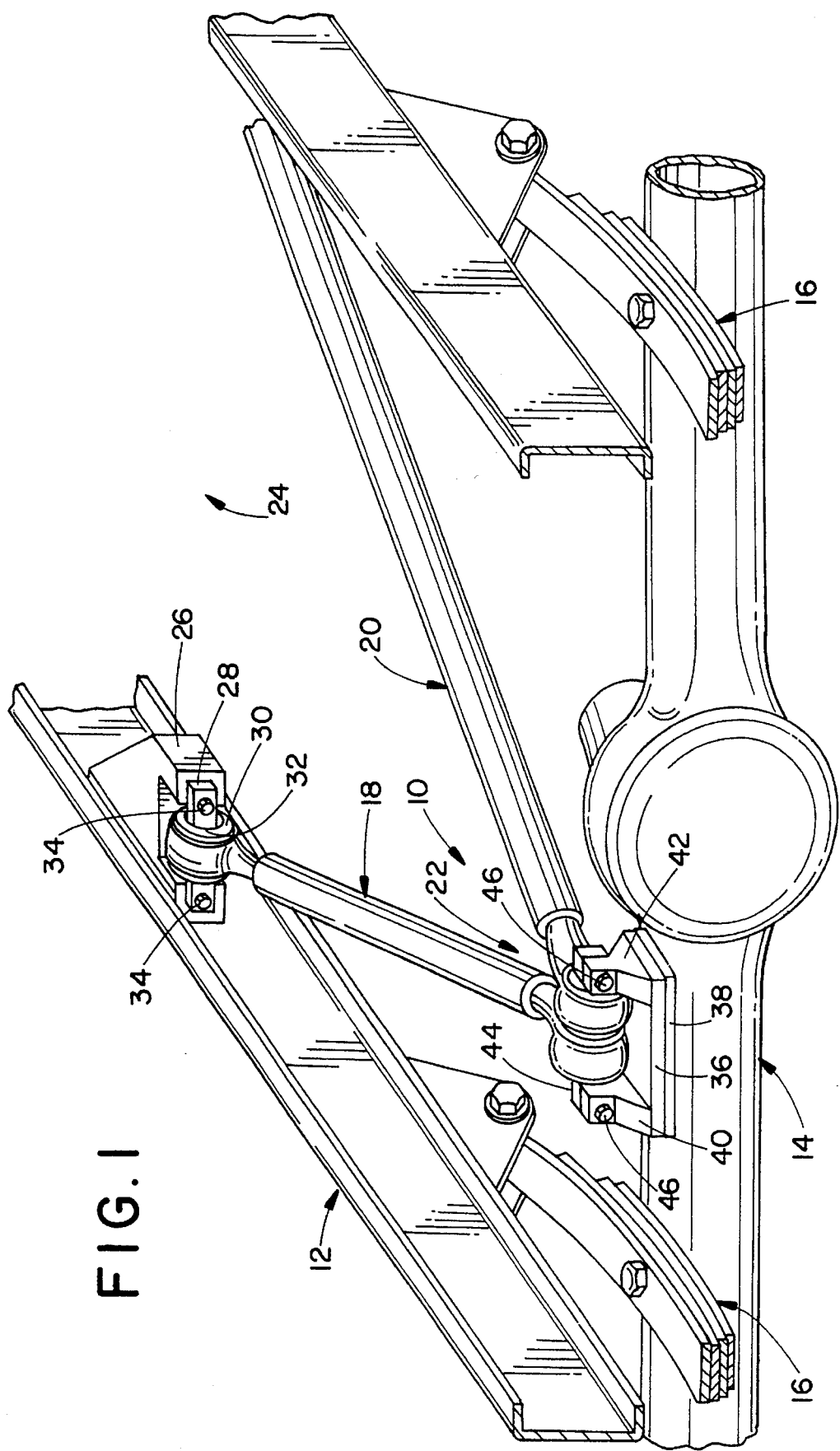
FIG. 1 is a perspective view of selected portions of a vehicle frame, suspension and axle system having disposed therein a torque rod assembly according to the present invention.

Referring now to the drawings wherein the showings are for purposes of illustrating the preferred embodiments of the invention only and not for purposes of limiting same, FIG. 1 provides a view of the overall preferred embodiment showing the subject V-shaped torque rod assembly installed in a vehicle. While it is appreciated that vehicle types may vary, resulting in variations of the suspension system, as exemplary shown here, the torque rod assembly 10 is utilized in conjunction with vehicle frame 12 and drive axle 14. The vehicle frame 12 and the drive axle 14 are connected by main spring supports 16.

The torque rod assembly 10 comprises subassemblies 18 and 20 which converge at an apex end 22 and divergingly extend to an open end 24. The open end 24, i.e., nonapex ends of subassemblies 18 and 20, of the assembly 10 is attached to the vehicle frame 12 by leg support brackets 26, and retainer bars 28, only one set of which is shown. The other leg support 26 and retainer bar 28 is supported on an opposite side of the frame 12 to engage subassembly 20. The bar 28 extends through elastomer bushing 30 which is disposed in eyelet 32 of the subassembly 18 and is connected to the leg support bracket 26 via connectors 34.

The apex end 22 of the torque rod assembly 10 is attached to the drive axle 14 by adapter plate 36 and mounting plate 38, which is welded to the axle.

Adapter plate 36 includes supports 40 and 42 which connect to retainer bar 44 via connectors 46. The bar 44 is received in the apex end 22 as will be hereinafter described with reference to FIGS. 2 and 3.

Figure 2:
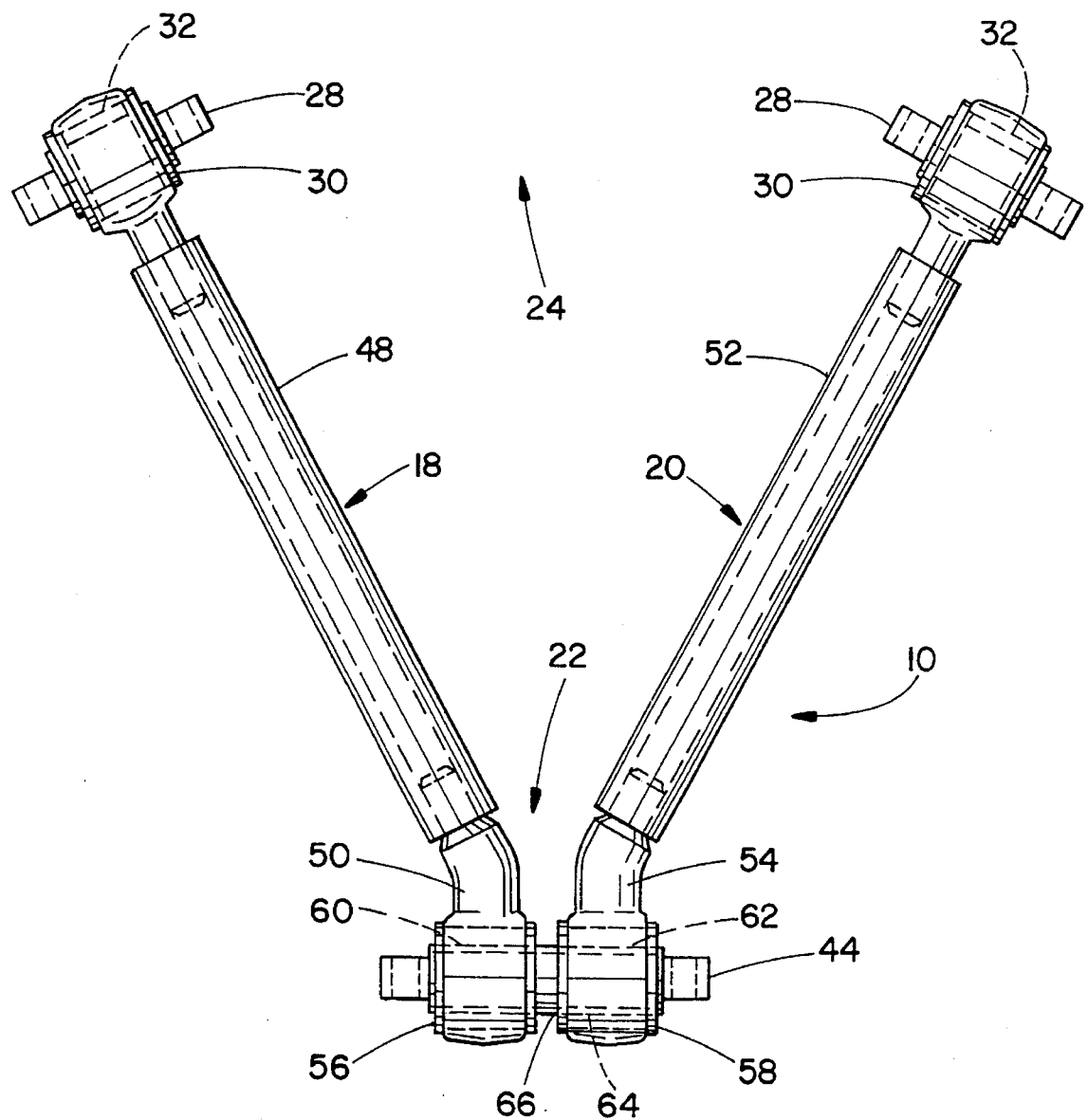
FIG. 2 is a top view of the torque rod assembly shown in FIG. 1.

Referring now more particularly to FIG. 2, the subassembly 18 also includes metal tube 48 and forged metal apex eyelet 50. Likewise, subassembly 20 includes metal tube 52 and forged metal apex eyelet 54. The eyelets 50 and 54 are illustrated as having a curved portion. The precise configuration of the eyelets is, however, dependent on the vehicle into which the assembly 10 is installed. Additionally, the tubes 48 and 52 may be curved and the eyelets generally straight. Likewise, the opposite ends of subassemblies 18 and 20 may be curved to adapt the assembly 10 to fit a particular vehicle.

Elastomer bushings 56 and 58 are respectively disposed in apex eyelets 50 and 54. The bushings 56 and 58 (shown partially in phantom) include apertures 60 and 62 which receive a metal collar 64. The bushings 56 and 58 are constructed of an elastomer material which will vary in configuration and composition from user to user depending on cost and durability desired. However, the preferred elastomer is generally cylindrical when compressed inside the eyelets and is 70 durometer points on the shore A scale. Moreover, any material exhibiting elastomeric qualities while still capable of withstanding the forces typically generated in a torque rod assembly is suitable.

The collar 64 (shown in phantom) is circumferentially disposed about the retaining bar 44. The collar 64 can be formed of either ferrous or non-ferrous metal for bonding purposes - but ferrous metals are preferred to provide adequate strength. It is recognized that if suitable alternative bonding techniques are used, collar 64 may not be necessary.

Additionally, a spacer 66 is positioned between the bushings 56 and 58 to facilitate independent articulation of each of the subassemblies 18 and 20. The spacer 66 is preferably constructed of metal. However, any material having a low coefficient of friction will suffice. Moreover, the spacer 66 is preferably a separate element from the collar, but it could also be integral therewith.

Figure 3:
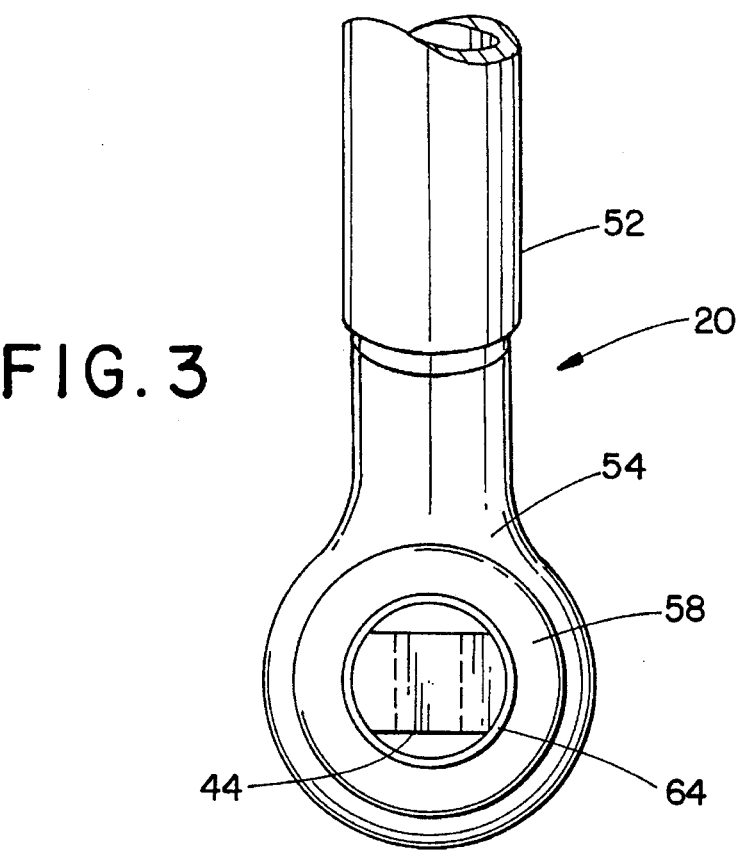
FIG. 3 is a partial side view of the torque rod assembly of FIGS. 1 and 2.

Referring now to FIG. 3, the retaining bar 44, preferably metal, is cylindrical in its mid-region so as to fit into circumferential collar 64. The collar 64 is received in circumferential bushing 58 which is likewise received in eyelet 54. The circumferential shape of the components facilitates articulation of the torque rod assembly 10. The retaining bar 44 includes generally rectangular ends so that it can be readily fastened to adapter plate 46.

Figure 4:
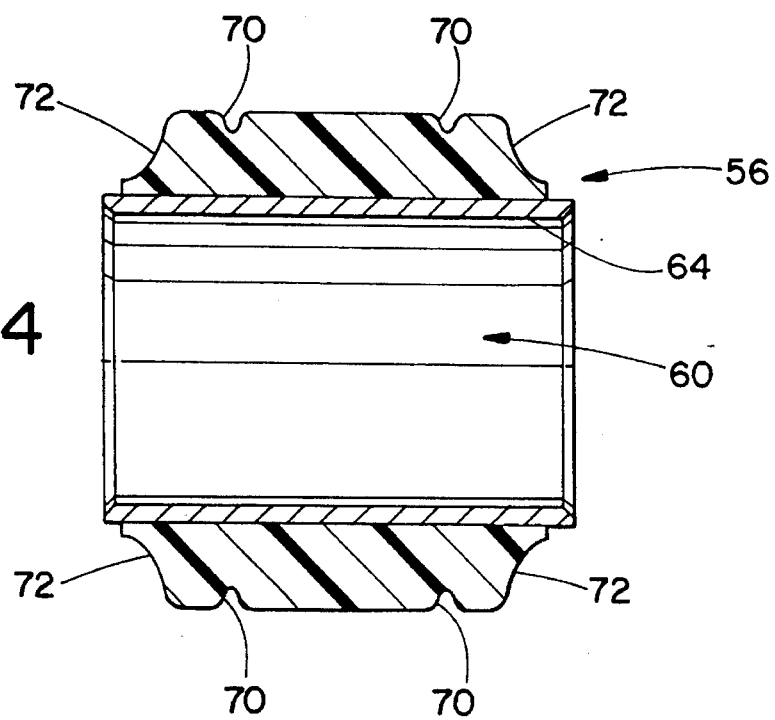
FIG. 4 is a cross-sectional view of a bushing and selected portions of the collar of the torque rod assembly of FIG. 1.

As shown in FIG. 4, in an uncompressed state, the bushing 56 (as well as bushings 58 and 30) preferably includes grooves 70 and bevelled edges 72. The configuration of the bushing allows for even distribution of stresses when the bushing is positioned in the forged eyelet and, thus, the life of the bushing is maximized. Moreover, the configuration facilitates retention of the bushing in its respective eyelet.

A portion of the collar 64 is illustrated. In the preferred embodiment, bushings 56 and 58 are mold bonded around the collar 64. However, it is contemplated that other suitable formation methods and configurations could accomplish the goals of the present invention. For example, the bushings could be formed separately and the collar 64 merely press fit into the apertures of the bushings.

The bushings are preferably press fit into the eyelets and maintained therein by a resulting friction fit. Alternatively, suitable bonding techniques may also be used. For example, an adhesive applied between the bushing and the inside surface of the eyelet would accomplish the goals of the invention.

Likewise, the retainer bar is maintained within the collar 64 via interference fit between the two metals. However, the collar may be bonded to retainer bar.

The operational and maintenance advantages of the present invention are numerous. As an example, the number of elastomer bushings is doubled over prior single joint designs, which improves shock and vibration isolation between the axle and frame. Since the apex has two elastomer bushings, it is capable of withstanding the same forces as applied to the two bushings on the opposite ends. Moreover, with the prior known rigid design, movement is restricted to rotation about a fixed point while the present invention allows shock and vibration isolation in all directions as a result of complete flexibility of the elastomer bushing.

The assembly of the present invention is capable of adjusting to variations in frame to axle mounting distances. As in all manufactured products, there are differences from vehicle to vehicle in the mounting locations on the axle and frame. With the prior known rigid apex design, only preloading of the two elastomer bushings opposite the apex will accommodate this variation. However, preloading the bushing is detrimental to its life. The present invention includes four bushings to preload which requires significantly less flexing on the bushings.

The apex bushings of the present invention are mounted perpendicular to the line of maximum braking and acceleration force, which is the most ideal configuration for this type of elastomer bushing. Further, the horizontal position of the elastomer bushing centerline relative to the ground is likewise a superior position relative to the vertical mounting of a single elastomer bushing apex.

All lubrication is eliminated and no seals are necessary. The mounting bolts are more accessible for removal of the assembly. The assembly is also designed in a manner that permits field replacement of bushings in the event of failure of the elastomer. If a failure of the prior rigid apex design occurs, the entire assembly must be discarded.

The design of the elastomer bushings of the present invention can be modified to provide either a higher load bearing capacity or a less expensive, lower load capacity assembly. This is done by substituting existing design bushings with the same inner and outer dimensions.

Each subassembly of the present invention can move independently. With the rigid apex, the entire assembly must move in one plane. The present invention offers an improved ride in that the movement of one side of the axle will not be transmitted to the opposite side. In addition, the stress at the apex of the rigid version is eliminated as the arms articulate separately.

The assembly of the present invention can be used in applications formerly using the rigid apex. Both rods use a mounting plate fastened to an axle mounting pad. Substitution generally requires only the proper design mounting plate for the improved design.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, we claim:

1. A torque rod assembly for use in a vehicle having a frame connected to a drive axle by springs and the torque rod assembly, the torque rod assembly having a generally V-shaped configuration with an apex end, the torque rod assembly comprising:
   a first subassembly having a first apex eyelet disposed at the apex end and a first frame eyelet adapted to be connected to the frame;
   a second subassembly having a second apex eyelet disposed at the apex end and a second frame eyelet adapted to be connected to the frame;
   elastomer bushings received in the first and second apex eyelets and the first and second frame eyelets, the bushings defining apertures in each eyelet;
   a first bar received in a first aperture of the first frame eyelet, the first bar adapted to be connected to the frame;
   a second bar received in a second aperture of the second frame eyelet, the second bar adapted to be connected to the frame; and,
   a third bar received in third and fourth apertures of the first and second apex eyelets, respectively, to join the first and second subassemblies.

2. The assembly as set forth in claim 1 further comprising a collar disposed around the third bar so that the collar is between the third bar and the bushings.

3. The assembly as set forth in claim 1 further comprising a spacer on the third bar positioned between the bushings on the third bar.

4. The assembly as set forth in claim 1 further comprising an adapter plate having supports, the supports connected to each end of the third bar.

5. The assembly as set forth in claim 4 further comprising a mounting plate connected to the adapter plate and adapted to be connected to the drive axle.

6. In a torque rod assembly having two subassemblies joined at an apex in a generally V-shaped configuration by a connecting means, each subassembly including an end to be joined at the apex, the improvement wherein the connecting means comprises:
   a bar;
   a cylindrical collar around the bar;
   a first elastomer bushing around the collar;
   a second elastomer bushing around the collar;
   a spacer between the first and second bushings;
   a first eyelet on the end of one of the subassemblies around the first bushing; and,
   a second eyelet on the end of the other of the subassemblies around the second bushing.

7. The assembly as set forth in claim 6 wherein the bar is connected to an adapter plate so as to connect the apex to a drive axle.

8. A torque rod assembly comprising:
   a first subassembly having a first eyelet;
   a first elastomer bushing received in the first eyelet, the first bushing defining a first aperture;
   a second subassembly having a second eyelet;
   a second elastomer bushing received in the second eyelet, the second bushing defining a second aperture; and,
   a bar received in the first and second apertures.

9. The assembly as set forth in claim 8 further comprising a collar disposed around the bar so that the collar is between the bar and the first and second bushings.

10. The assembly as set forth in claim 8 further comprising a spacer on the bar positioned between the first and second bushings.

11. The assembly as set forth in claim 8 wherein the first and second eyelets are formed of forged steel.

12. The assembly as set forth in claim 8 wherein the bar is metal.

13. The assembly as set forth in claim 9 wherein the collar is metal.

14. The assembly as set forth in claim 10 wherein the spacer is metal.

15. The assembly as set forth in claim 8 further comprising an adapter plate having two supports, the bar being connected at each end to a support.

16. The assembly as set forth in claim 15 further comprising a mounting plate connected to the adapter plate and adapted to be connected to a vehicle.

* * * * *